United States Patent
Wei et al.

(10) Patent No.: US 11,536,251 B2
(45) Date of Patent: Dec. 27, 2022

(54) PRIORITIZATION OF POWER GENERATING UNITS OF A POWER PLANT COMPRISING ONE OR MORE WIND TURBINE GENERATORS

(71) Applicant: VESTAS WIND SYSTEMS A/S, Aarhus N (DK)

(72) Inventors: Mu Wei, Solbjerg (DK); Karthik Krishnan Jamuna, Trivandrum (IN); Jacob Quan Kidmose, Risskov (DK); Søren Sønderbo Andersen, Silkeborg (DK); Søren Kappelgaard, Aarhus N (DK)

(73) Assignee: VESTAS WIND SYSTEMS A/S, Aarhus N (DK)

( * ) Notice: Subject to any disclaimer, the term of this patent is extended or adjusted under 35 U.S.C. 154(b) by 0 days.

(21) Appl. No.: 17/416,968

(22) PCT Filed: Dec. 11, 2019

(86) PCT No.: PCT/DK2019/050385
§ 371 (c)(1),
(2) Date: Jun. 21, 2021

(87) PCT Pub. No.: WO2020/125887
PCT Pub. Date: Jun. 25, 2020

(65) Prior Publication Data
US 2022/0082085 A1    Mar. 17, 2022

(30) Foreign Application Priority Data

Dec. 18, 2018   (IN) .............................. 201811047863

(51) Int. Cl.
*F03D 7/00*     (2006.01)
*F03D 7/04*     (2006.01)
*F03D 7/02*     (2006.01)

(52) U.S. Cl.
CPC ............ *F03D 7/048* (2013.01); *F03D 7/0292* (2013.01); *F05B 2270/109* (2013.01);
(Continued)

(58) Field of Classification Search
CPC ................... F03D 7/0292; F03D 7/048; F05B 2270/1033; F05B 2270/109; F05B 2270/332; F05B 2270/335
See application file for complete search history.

(56) References Cited

U.S. PATENT DOCUMENTS 8,598,726 B1    12/2013  Yasugi et al.
2010/0308585 A1  12/2010  Jorgensen et al.
(Continued)

FOREIGN PATENT DOCUMENTS

EP    1790851 A2      5/2007
EP    2743500 A1 *   6/2014   ............ F03D 17/00
WO    2020125887 A1   6/2020

OTHER PUBLICATIONS

PCT Notification of Transmittal of the International Search Report and the Written Opinion of the International Searching Authority, or the Declaration for Application No. PCT/DK2019/050385 dated Feb. 24, 2020.

*Primary Examiner* — Julio C. Gonzalez
(74) *Attorney, Agent, or Firm* — Patterson + Sheridan, LLP

(57) ABSTRACT

The invention relates to a method for determining power set points of a power plant comprising a plurality of power generating units with at least one wind turbine generator. The determination of the power set points are based on a prioritization of the power generating units, where the power generating units are prioritized with respect to individual power levels or fatigue levels obtained for the power generating units. The prioritization is adjusted so that the (Continued)

adjusted prioritization depends both on the power and fatigue levels.

17 Claims, 5 Drawing Sheets

(52) U.S. Cl.
CPC . *F05B 2270/1033* (2013.01); *F05B 2270/332* (2013.01); *F05B 2270/335* (2013.01)

(56) References Cited

U.S. PATENT DOCUMENTS

2014/0207296 A1\* 7/2014 Kjær ........................ F03D 7/00
700/287
2017/0321655 A1\* 11/2017 Møller .................... F03D 9/257

\* cited by examiner

PRIORITIZATION OF POWER GENERATING UNITS OF A POWER PLANT COMPRISING ONE OR MORE WIND TURBINE GENERATORS

FIELD OF THE INVENTION

The invention relates to control of power plants, particularly power plants which has one or more wind turbines and to determination and dispatching of power set points to the power generating units of the power plant.

BACKGROUND OF THE INVENTION

Mechanical and electrical components of the power generating units such as wind turbine generators are exposed to fatigue loading. Fatigue loading may reduce lifetime, increase power production costs, increase the need for service operations for repairing and replacing components.

The fatigue load of components of the power generating units may be monitored in order to be able to take actions such as unplanned service operations to avoid serious failures of the power generating unit. Thus, a power plant comprising a plurality of power generating units may require repeated and unpredictable service operations which may not be acceptable in view of the maintenance costs of the power plant.

In view of the present solutions which are available for operating a power plant with a plurality of power generating units, there is a need for solutions which improve operation of power plants to provide improved handling of fatigue loads, e.g. in order to reduce production costs, increase reliability, improve production stability and to increase length of service intervals and lifetime of the power generating units.

EP 2 896 102 B1 discloses a method for an intelligent dispatching of the power production to wind turbines and optional compensation equipment of a wind power plant, as the power producing units of a wind power plant. The invention relates to a case where the requested produced power is less than the total capacity of the power plant, and the invention relates to utilizing this situation to dispatch set points to the wind turbines and the compensation equipment based on correction factors relating to the operating conditions of the wind park. This method may increase the wind turbines' lifetime, help in scheduling maintenance and expand the electrical operating range of the wind power plant.

Whereas EP 2 896 102 B1 addresses operation of power plants and increase of the lifetime, the inventors of the present invention has appreciated that an improved solution is of benefit, and has in consequence devised the present invention.

SUMMARY OF THE INVENTION

It is an object of the invention to improve control of power plants to alleviate one or more of the above mentioned problems, and therefore to provide a method which provides an improved way of handling fatigue loads.

In a first aspect of the invention, a method for controlling power generation from a power plant which comprises a plurality of power generating units including at least one wind turbine generator is presented, where the power generation system is connected to an electrical power grid for supplying power from the power generating units to the electrical power grid, and where the power generating units are controllable to produce power dependent on individual power set points, the method comprises:

obtaining a fatigue level for each of the of power generating units, where the fatigue level is indicative of a combined accumulated fatigue level of one or more mechanical components of the power generating unit, obtaining at least one power level for each of the power generating units, where the power level is indicative of the maximum power that can be produced by the power generating unit or indicative of the power produced by the power generating unit, determining a prioritized list of the power generating units wherein the power generating units are prioritized dependent on either the fatigue levels or the power levels, adjusting the prioritized list dependent on the one of the fatigue levels or the power levels which were not used for determining the prioritized list of the power generating units, and determining the power set points for at least a fraction of the power generating units based on the prioritization of the power generating units in the adjusted prioritized list.

Advantageously, by prioritizing the power generating units with respect to power levels or fatigue levels a first ordering of the units is obtained for determining power set points in an appropriate way, e.g. so that the power generating units which have the most favorable power levels to realize a change in the power plant reference is given highest priority, e.g. so that the required change in the power plant reference is distributed among the highest prioritized power generating units. For example, power generating units which have a high available power are more favorable than units with a lower available power to support an increase in the power plant reference. Similarly, power generating units which have a high power production are more favorable than units with a lower power production to support a decrease in the power plant reference. Similarly, power generating units which have the lowest accumulated fatigue levels or highest fatigue margins to a design margin may be may be more favorable to support an increase or decrease in the power plant reference due to the loads associated with changing the power production and/or increase power production.

Further, by adjusting the prioritization with respect to the fatigue level or power level which were not used for the initial prioritization, the prioritization can be refined. For example, a power generating unit located as number two in a list prioritized with respect to a power level may have a lower accumulated fatigue level than the highest prioritized power generating unit and is therefore more favorable to support a change in the power plant reference in view of its capability to accumulate more fatigue loads. Similarly, a power generating unit located as number two in a list prioritized with respect to fatigue level may have a higher power level than the highest prioritized power generating unit and is therefore more favorable to support a change in the power plant reference.

The adjusting step comprises reversing the order in the prioritization of two power generating units located next to each other in the prioritization dependent on the difference between the power levels and/or the fatigue levels of the two power generating units, That is, the order is reversed if the power levels of two neighbor power generating units are similar, i.e. numerically close relative to a threshold, and the fatigue level for the lower prioritized power generating unit is lower than the higher for the higher prioritized power generating unit, i.e. lower within a numerical threshold.

Here the fatigue level is an accumulated fatigue load, i.e. a fatigue load accumulated over time. On the other hand, if the power levels of two neighbor power generating units are not similar, e.g. if the power levels are greater than a threshold, the order of the neighbor power generating unit may not be reversed.

According to an embodiment, obtaining the at least one power level comprises obtaining an available power level indicative of the maximum power that can be produced by the power generating unit, and/or obtaining an actual power level indicative of the power currently produced by the power generating unit.

According to an embodiment the power set points have been determined based on using the available power level for the determination of the prioritized list or for the adjusting of the prioritized list, in case of an increase in a power reference for a desired power production of the power plant, or where the power set-points have been determined based on using the actual power level for the determination of the prioritized list or for the adjusting of the prioritized list, in case of a decrease in a power reference for a desired power production of the power plant.

Advantageously, by using either the available power levels or the actual power levels of the power generating units for the initial prioritization or adjusting, the set points are determined on basis of a prioritization which is optimized, or at least suitable, for the actual decrease or increase in the power reference.

According to an embodiment, the adjusting of the prioritized list comprises determining a difference between the power level of a first one of the power generating units in the prioritized list and the power level of a second one of the power generating units located at a lower priority than the first power generating unit, or determining a difference between the fatigue level of the first one of the power generating units in the prioritized list and the fatigue level of the second one of the power generating units located at a lower priority than the first power generating unit, and dependent on the difference, comparing the one of the fatigue levels or the power levels, which were not used for determining the prioritized list of power generating units, of the first and second power generating units, changing the order of the first and second power generating units in the prioritized list dependent on the comparison of the fatigue levels or the power levels.

Advantageously, by comparing power generating units pairwise, and swapping neighbor power generating units in the pair, the prioritization does not only consider the first prioritization parameter, i.e. power level or fatigue level, but also the second prioritization parameter, i.e. the parameter which were not used for the initial prioritization. In this way, the prioritization takes into account both electrical and mechanical considerations.

According to an embodiment, the order of the first and second power generating units is changed if the fatigue level of the second power generating unit indicates a lower fatigue than the fatigue level for of first power generating unit, or if the power level of the second power generating unit is higher than the power level of the first power generating unit.

It is understood that the comparison to determine if the fatigue or power levels are lower or higher than the neighbor fatigue or power levels may be a threshold comparison, e.g. so that the order of the first and second power generating units is changed if the difference between the fatigue levels of first and second power generating units is greater than a first threshold, or if the difference between the power levels the second and first power generating units is greater than a second threshold.

According to an embodiment, the adjusting of the prioritized list are performed pairwise for consecutive pairs of power generating units in the prioritized list, wherein a pair following a higher prioritized pair comprises the lower prioritized power generating unit of the higher prioritized pair.

Advantageously, by comparing power generating units in pairs where a lower prioritized pair overlaps the higher prioritized pair, a power generating unit which is initially given a low prioritization could be advanced to a higher priority, possibly up to the highest priority, by performing the adjusting repeatedly. Thus, the adjusting may comprise performing the adjusting one or more times sequentially, i.e. without performing the initial prioritization between succeeding adjusting steps.

According to an embodiment, the method comprises sequentially determining the prioritized list and/or sequentially adjusting the prioritized list dependent on the one of the fatigue levels or the power levels which were not used for determining the prioritized list of power generating units.

Advantageously, by sequentially performing the prioritization and/or adjusting, i.e. by sequentially prioritizing without a subsequent adjusting, by sequentially performing prioritizing combined with a subsequent adjusting, or by sequentially adjusting without a preceding prioritization, an updated prioritization or adjusted prioritization is always available for updating the power set points. The power set points can be updated in response to a change in the power plant reference or the power set points could be checked, possibly adjusted, sequentially, in order to regularly optimize the power set points on basis of the prioritized or adjusted prioritized list.

According to an embodiment, the prioritized list and/or adjusting the prioritized list is determined in response to a change of a power reference for a desired power production of the power plant.

According to an embodiment, the method comprises determining if the prioritization will be performed dependent on the fatigue levels or the power levels based on an operating time of the power generating units since installation.

Advantageously, it may be favorable to e.g. prioritize the power generating units dependent on fatigue levels if the average fatigue level of the power generating units is above a predetermined level or if the power generating units are relatively high operation time.

According to an embodiment, the fatigue level for each of the power generating units is obtained based on a weighted sum of component fatigue levels of one or more mechanical components of each power generating unit.

Advantageously, using differentiated weighting of the fatigue level, it is possible to accelerate further fatigue loading of a particular component, e.g. by setting a low weighting factor. This could be relevant is a replacement is planned in near future. Further accumulated fatigue loading of a component could be slowed, e.g. by setting a high weighting factor. This could be relevant if the fatigue level of a component is becoming critical, e.g. to avoid critical faults.

According to an embodiment, the fatigue level is determined as a fatigue margin based on differences between component fatigue levels of one or more components and predetermined design fatigue limits of the one or more components. Thus, the fatigue level may be determined as a level which increases as the fatigue load accumulates, or the fatigue level may be determined as a level which decreases as the accumulated fatigue load approaches the design limit.

According to an embodiment, the fatigue level for each power generating unit is weighted dependent on a rate of change of fatigue levels determined for one or more components. Accordingly, if a power generating unit has a slow increase of the accumulate fatigue load, the weighting of the fatigue level can be modified to increase the prioritization of that power generating unit, i.e. the fatigue level is increased or decreased dependent on whether the fatigue level is determined as a margin relative to a design limit or is determined as a level which increases with the accumulation of fatigue loading.

A second aspect of the invention relates to a central controller for controlling power production of a power plant which comprises a plurality of power generating units including at least one wind turbine generator, where the power plant is connected to an electrical power grid for supplying power from the power generating units to the electrical power grid, and where at the central controller is arranged to dispatch individual power set points to the power generating units, and where the central controller is arranged to perform the method according to the first aspect.

A third aspect of the invention relates to a power plant which comprises a plurality of power generating units including at least one wind turbine generator and the central controller according to the second aspect.

A fourth aspect of the invention relates to a computer program product comprising software code adapted to control a power plant when executed on a data processing system, the computer program product being adapted to perform the method according to the first aspect.

In general, the various aspects and embodiments of the invention may be combined and coupled in any way possible within the scope of the invention. These and other aspects, features and/or advantages of the invention will be apparent from and elucidated with reference to the embodiments described hereinafter.

BRIEF DESCRIPTION OF THE DRAWINGS

Embodiments of the invention will be described, by way of example only, with reference to the drawings, in which.

DESCRIPTION OF EMBODIMENTS

Figure 1:
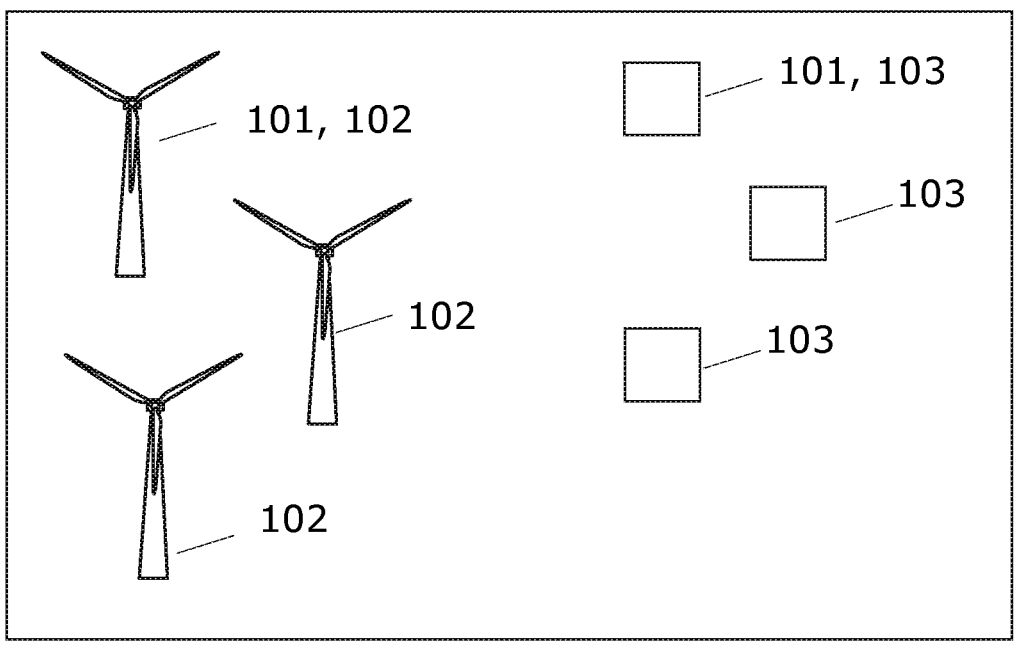
FIG. 1 shows a power plant which comprises a plurality of power generating units such as wind turbines.
Figure 1:
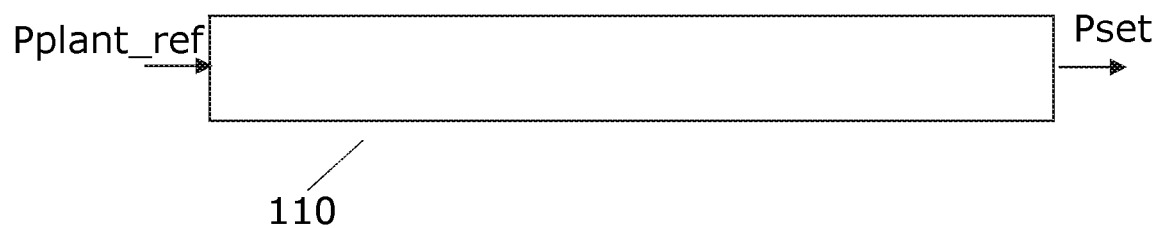

FIG. 1 shows a power plant 100 which comprises a plurality of power generating units 101 such as wind turbines. The power plant 100 may be a renewable power plant comprising only renewable power generating units. In general, the power generating units 101 may consist of different types of power generating units, e.g. different types of renewable power generating units such as solar power units 103 (e.g. photovoltaic solar panels) and wind turbines. The different types of power generating units 101 may also include fossil based power production units, e.g. diesel engines. According to an embodiment, at least one of the power producing units 101 of the power plant 100 is a wind turbine. The power plant 100 may comprise at least three power generating units 101 of the same or different types, i.e. a mix, of different types of power generating units. For example, the power plant 100 may consist only of wind turbines 102 and in this case at least three wind turbines 102. In another example, the power plant 100 comprises at least two wind turbines 102 and at least one or two other power generating units 101.

The power plant is connectable with an electrical power grid (not shown) for supplying power from the power generating units 101 to the electrical power grid.

The power plant 100 is controlled by a central controller 110. The central controller 110 is arranged to control power generation from the power generating units 101 according to a power plant reference Pplant_ref which defines the desired power to be supplied to the grid from the power plant 100. Furthermore, the central controller is arranged to dispatch power set-points Pset to the power generating units, i.e. individual power set-points to each power generating unit 101 which sets the desired power productions. The power set-points Pset may be determined by the central controller 110 dependent on the power plant reference Pplant_ref so that the sum of power set-points Pset corresponds to the power plant reference Pplant_ref.

Throughout this description, power reference is used for the demanded power for the wind power plant, whereas power set-point is used for the demanded power for the individual power generating units.

Thus, an objective of the central controller 110 or a dispatcher comprised by the central controller is to ensure that the demanded power (e.g. from the Transmission System Operator (TSO)) is delivered as fast as possible, this applies both to increase and decrease in the power reference, Pplant_ref.

The wind turbine 101 may comprise a tower and a rotor with at least one rotor blade, such as three blades. The rotor is connected to a nacelle which is mounted on top of the tower and being adapted to drive a generator situated inside the nacelle. The rotor is rotatable by action of the wind. The wind induced rotational energy of the rotor blades is transferred via a shaft to the generator. Thus, the wind turbine is capable of converting kinetic energy of the wind into mechanical energy by means of the rotor blades and, subsequently, into electric power by means of the generator. The generator may include a power converter for converting the generator AC power into a DC power and a power inverter for converting the DC power into an AC power to be injected into the electrical power grid.

The generator of the wind turbine 102, or other power generating unit 101, is controllable to produce power corresponding to the power set-point Pset provided by the central controller 110. For wind turbines, the output power may be adjusted according to the power set-point by adjusting the pitch of the rotor blades or by controlling the power converter to adjust the power production. Similar adjustment possibilities exists for other power generating units 101.

Herein any reference to power such as power plant reference Pplant_ref, power set points Pset, available power Pav and produced power Pprod can define active, reactive or apparent power levels. According to an embodiment, the power levels, such as Plant_ref, Pset, Pav, Pprod and other related power levels are active power levels.

Figure 2:
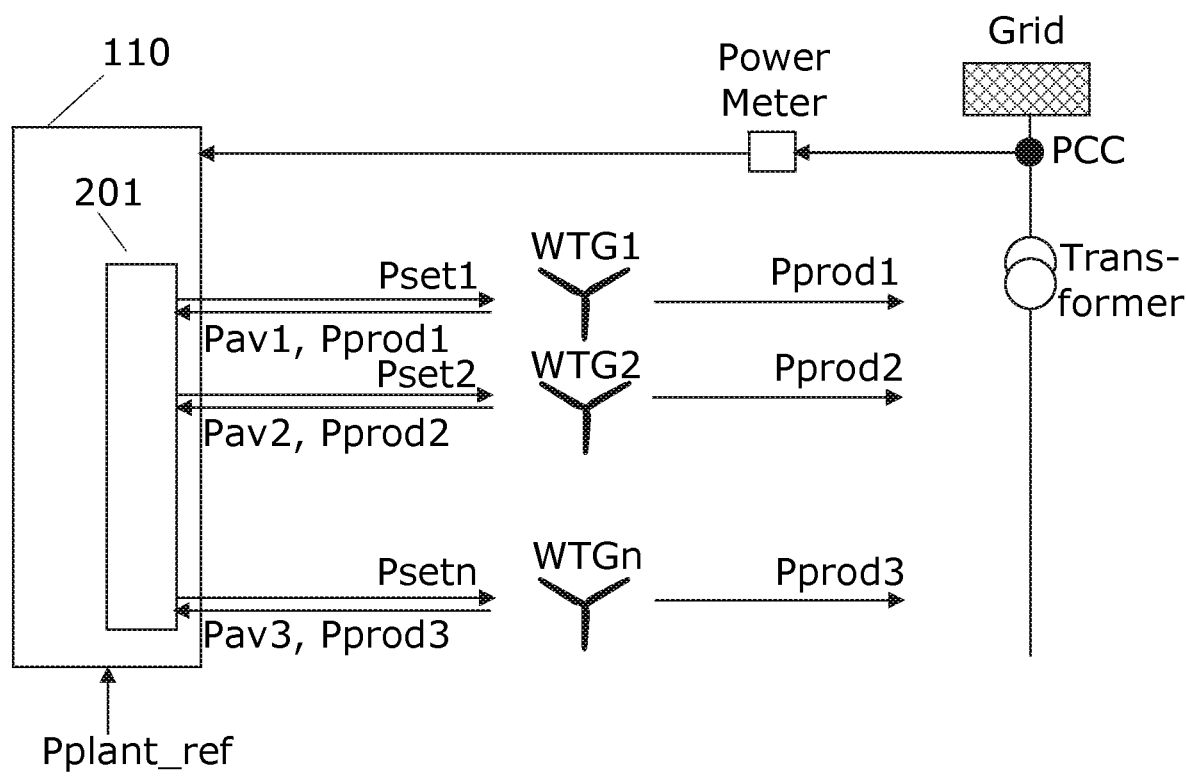
FIG. 2 shows a configuration of the power plant and dispatcher.

FIG. 2 exemplifies the arrangement of the calculation modules inside a dispatcher. In this example, the power generating units 101 are wind turbine generators 102, but the power generating units could also comprise a mix of wind turbine generators and other types of power generating units. Therefore, in order to keep the description general, reference is made to power generating units 101 unless the specific contest refers to a wind turbine example.

It can be seen that the dispatcher 201 is disclosed as being part of a central controller 110. The dispatcher receives the power plant reference Pplant_ref and determines the power set points Pset, e.g. power set points Pset1, Pset2, . . . , Psetn for the respective wind turbine generators WTG1, WTG2, . . . , WTGn, based on a plurality of status feedback signals. The feedback signals comprise the available power of the individual power generating units Pav1 . . . Pavn and the produced power of individual power generating units Pprod1 . . . Prodn.

Pav1 is the power available from a wind turbine 102 at the given time, calculated based on the current wind speed and other parameters limiting the power production. Thus, the available power of the power system is therefore the aggregation of the individual available powers. Pprod1 is the power produced by a specific wind turbine 102 at the given time.

In case the power plant reference Pplant_ref is increased, the determination of the individual power set points Pset is determined based on available power of the individual power generating units Pav1 . . . Pavn. In case the power plant reference Pplant_ref is decreased, the determination of the individual power set Pset is determined based on and the produced power of individual power generating units Pprod1 . . . Prodn.

The actual power production Pprod1 . . . Prodn of the power generating units 101 is fed to a feeder line, which is connected to a Point of common coupling (PCC) via a transformer. At the PCC the aggregated power production is measured by means of a power meter. The measured power (P measurement) is communicated to the PPC.

The mechanical and electrical components of the power generating units, e.g. wind turbine generators, are exposed to fatigue loading which require repairing and replacement of the components. When a control mechanism is not present between a monitoring system for monitoring the fatigue loading and the dispatcher of the power plant controller, it is not possible to adapt the determination of the power set points Pset dependent on the fatigue loading or the monitoring of the fatigue loading.

On the other hand, by introducing such a control mechanism it is possible to determine the power set points Pset dependent on the fatigue level obtained for each of the of power generating units.

Examples of the mechanical components of the wind turbines generators which may be exposed to fatigue loading comprise the gearbox, the generator, the rotor, the yaw system, blades and other components.

Figure 3A:
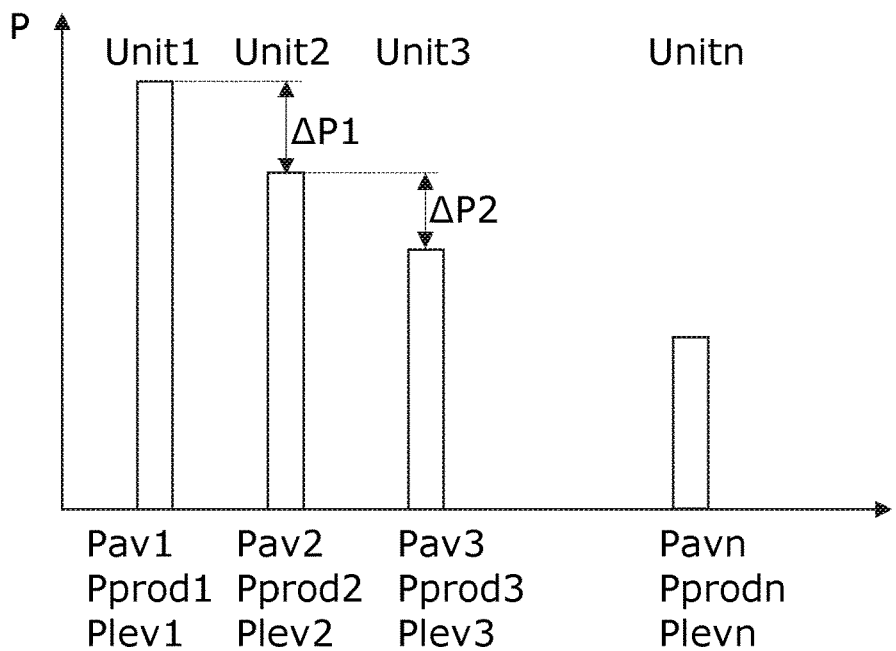
FIG. 3A-B illustrates prioritization dependent on power level and adjusting dependent on fatigue level.
Figure 3B:
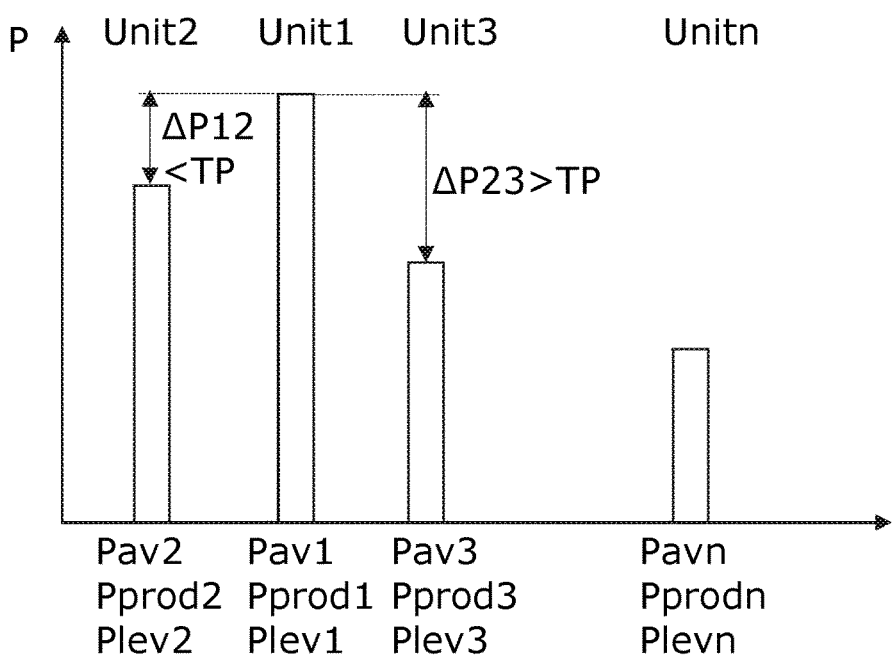

FIGS. 3A-B illustrates a method according to an embodiment for controlling power generation from the power plant 100 by determining power set points for at least some of the power generating units based on a determined prioritization of the power generating units.

The power plant 110 comprises a plurality of power generating units 101. The method may involve determination of power set points for all units 101 in the power plant 110 or for a fraction of the units 101 based on power and fatigue data from the same units.

The method is based on fatigue levels Flev which have been obtained for each of the power generating units 101, i.e. at least a fraction of the power generating units of the power plant 100. The fatigue level for a given power generating unit 101 can be a fatigue level for one or more individual components of the power generating unit or for the entire power generating unit 101, or other fatigue level associated with the power generating unit 101. Thus, the fatigue level may be determined as a combined accumulated fatigue level of one or more mechanical components of the power generating unit. For example, the fatigue level for one component, e.g. the gearbox, is accumulated over some period of time, and the accumulated fatigue levels for different components, e.g. the gearbox and the blades, may be combined into an aggregated fatigue level. Examples of determining fatigue levels are provided later in the description.

The available power level Pav and/or the actual power level Pprod is determined for individual power generating units and for at least a fraction of two or more of all power generating units of the power plant 110. It may not be necessary to obtain both the available power level Pav and the actual power level Pprod since the available power level Pav may only be required in case of an increase in the power plant reference Plant_ref and since the actual power level Pprod may only be required in case of a decrease in the power plant reference Plant_ref. Thus, in general at least one power level, Pav and/or Pprod, is obtained for each of the power generating units.

The available power level Pav and the actual power level Pprod are both referred to as the power level Plev of a power generating unit 101.

As shown in FIG. 3A, in response to a change in the power plant reference Pplant_ref, in response to a periodic calculation event (i.e. sequentially) or in response to other event, a prioritization of the power generating units is determined dependent on the power levels, i.e. dependent on either available power level Pav or the actual power level Pprod. Alternatively, one prioritization is determined dependent on the available power, while another prioritization is determined dependent on the actual power level Pprod. The prioritization may be in the form of an ordered list, prioritization numbers assigned to the power generating units or other ways of providing a prioritized order.

FIG. 3A shows that the power level Plev2 of power generating unit Unit2 is lower than Plev1 of power generating unit Unit1 by ΔP12 and, therefore, prioritized just below Unit1. Accordingly, Unit1 has the highest available power Pav1 and/or the highest power production Pprod1.

As a next step, as shown in FIG. 3B, and again in response to a change in the power plant reference Pplant_ref, in response to a periodic calculation event, in response to other event, or in response to the previous prioritization based on the power levels Plev, the prioritization is adjusted dependent on the fatigue levels Flev of the power plant units 101.

The adjustment comprises a comparison of the power levels Plev of two neighbor power generating units 101, i.e. power generating units located next to each other in the prioritized list or prioritized order. If the difference between the power levels Plev is low, e.g. ΔP12 is lower than a threshold TP, the order of the two power generating units is reversed, i.e. swapped, if the fatigue level of the lower prioritized power generating unit (here Unit2) is lower than the fatigue level of the higher prioritized power generating unit (here Unit 1) (or the difference between the fatigue levels of neighbor power generating units is above some threshold). Subsequently, the power levels of the subsequent pair of power generating units are compared in the same way. As illustrated, the power difference ΔP23 of the following pair is greater than TP and, therefore, the order is left unchanged.

A pair of power generating units for the pairwise comparison of the power levels Plev and the fatigue levels is determined so that a pair (e.g. Unit2 and Unit3) following a higher prioritized pair (e.g. Unit1 and Unit2) comprises one of the power generating units of the higher prioritized pair, or so that the lower prioritized pair (e.g. Unit2 and Unit3) following the higher prioritized pair (e.g. Unit1 and Unit2) comprises the lower prioritized power generating unit (Unit2) of the higher prioritized pair (in the prioritized list before a possible swap).

The method for prioritizing and adjusting described in FIG. 3A and FIG. 3B can be formulated as an algorithm, for example as:
Compare the power levels of two neighbour power generating units,
    if the power level difference is below a threshold,
        then compare the fatigue levels of the neighbour power generating units,
            if the difference of the fatigue levels is bigger than a threshold,
                then make the list of power generating units so that the power generating unit with the lower fatigue level is ranked above power generating unit with the higher fatigue level,
            otherwise maintain the same ranking in the list, i.e. no need to swap,
    otherwise maintain the same ranking in the list because the difference is significant and the electrical performance is more important than taking care of fatigue levels.

The algorithm is performed for pairs of power generating units in the list and may be repeated iteratively for the entire list of power generating units.

The threshold TP may be user defined or may be a fixed power threshold. For example, the threshold TP may be set as a percentage of the nominal power of the power generating unit 101.

Thus, the adjustment comprises reversing the order in the prioritization, e.g. prioritized list, of two power generating units located next to each other in the prioritization dependent on the difference between the power levels and the fatigue levels of the two power generating units. That is, the order is reversed if the power levels of two neighbor power generating units are similar and the fatigue level for the lower prioritized power generating unit is lower than the higher for the higher prioritized power generating unit. On the other hand, if the power levels of two neighbor power generating units are not similar, e.g. if the power levels are greater than the threshold TP, the order of the neighbor power generating unit are not reversed.

As a next step, and again in response to a change in the power plant reference Pplant_ref, in response to a periodic calculation event, in response to other event, or in response to the previous adjustment of the prioritization, the power set points Pset for at least a fraction of the power generating units 101 is determined or checked based on the prioritization of the power generating units in the adjusted prioritized list. For example, this may be performed so that at least the highest prioritized power generating units are assigned a modified power set-point or so that the determination of the power set-points is performed in order of the prioritization.

For example, in response to an increase in the power plant reference Pplant_ref, the power set points Pset are increased, possibly up to the available power level Pav or a fraction thereof. In this case, the prioritization based on the available power Pav is used. It may not be necessary to increase the power set points Pset of all power generating units in the adjusted prioritization, but a number of the highest prioritized power generating units may be sufficient to meet the increased power plant reference Pplant_ref.

In another example, in response to a decrease in the power plant reference Pplant_ref, the power set points Pset are decreased, possibly down to a minimum power, some power level above the minimum power Pmin and/or as a fraction of the actual power production Pprod of the individual power generating unit 101, In this case, the prioritization based on the produced power Pprod is used since those units 101 with the highest power productions have the largest capacity to provide a power reduction—i.e. they have the largest margin to a minimum power Pmin. It may not be necessary to decrease the power set points Pset of all power generating units in the adjusted prioritization, but a number of the highest prioritized power generating units may be sufficient to meet the decreased power plant reference Pplant_ref.

Figure 4A:
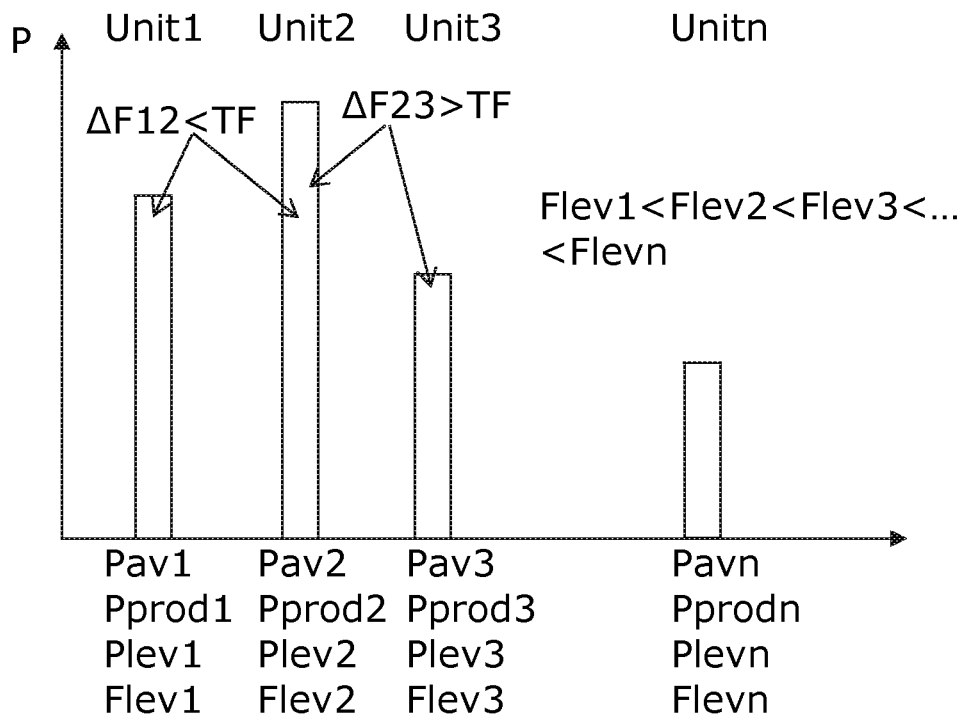
FIG. 4A-B illustrates prioritization dependent on fatigue level and adjusting dependent on power level.

FIGS. 4A and 46 shows an example of prioritizing the power generating units 101 based on the fatigue levels Rev obtained for each of the power generating units 101 instead of Power levels Plev. The principles for prioritizing and adjusting the prioritization in examples in FIG. 3A-B are equivalent with the those of the examples in FIG. 4A-B, with the difference that the fatigue levels Flev are used for the first prioritization and power levels Plev are used for adjusting the prioritization in the examples of FIG. 4A-B.

As shown in FIG. 4A, in response to a change in the power plant reference Pplant_ref, in response to a periodic calculation event (i.e. sequentially) or in response to other event, a prioritization of the power generating units is determined dependent on the individual fatigue levels Flev. Accordingly, the power generating units 101 are prioritized in order of increasing fatigue levels Flev so that the highest prioritized unit 101 has the lowest fatigue level Flev1. Thus, nevi for Unit 1 is smaller than Flev2 for Unit2, etc.

In FIG. 4A the fatigue level Flev2 of power generating unit Unit2 is higher than Flev1 of power generating unit Unit1 by an amount ΔF12 and, therefore, prioritized just below Unit1. Accordingly, Unit1 has the lowest fatigue level Rev.

As a next step, as shown in FIG. 4B, and again in response to a change in the power plant reference Pplant_ref, in response to a periodic calculation event, in response to other event, or in response to the previous prioritization based on the fatigue levels Flev, the initial prioritization is adjusted dependent on the power levels Plev of the power plant units 101.

The adjustment of the prioritization may be based on the available power levels Pav, the actually produced power levels Pprod or both. Thus, an adjustment may be determined based on both Pav or Pprod so that adjusted prioritizations are available for the dispatcher both for increases and decreases of the power plant reference Pplant_ref.

The adjustment comprises a comparison of the fatigue levels Flev of two neighbor power generating units 101, i.e. power generating units located next to each other in the prioritized list. If the difference between the fatigue levels Flev is low, e.g. if ΔF12 is lower than a threshold TF, the order of the two power generating units is reversed, if the power level Plev2 of the lower prioritized power generating unit (here Unit2) is higher (or the difference between the power levels of neighbor power generating units is above some threshold) than the power level Plev1 of the higher prioritized power generating unit (here Unit 1).

Subsequently, the power levels of the subsequent pair of power generating units are compared in the same way. As illustrated, the fatigue level difference ΔF23 of the following pair is greater than TF and, therefore, the order is left unchanged.

A pair of power generating units for the pairwise comparison of the fatigue levels Flev and the power levels Plev is determined so that a pair (e.g. Unit2 and Unit3) following a higher prioritized pair (e.g. Unit1 and Unit2) comprises one of the power generating units of the higher prioritized pair, or so that the lower prioritized pair (e.g. Unit2 and Unit3) following the higher prioritized pair (e.g. Unit1 and Unit2) comprises the lower prioritized power generating unit (Unit2) of the higher prioritized pair (in the prioritized list before a possible swap).

Figure 4B:
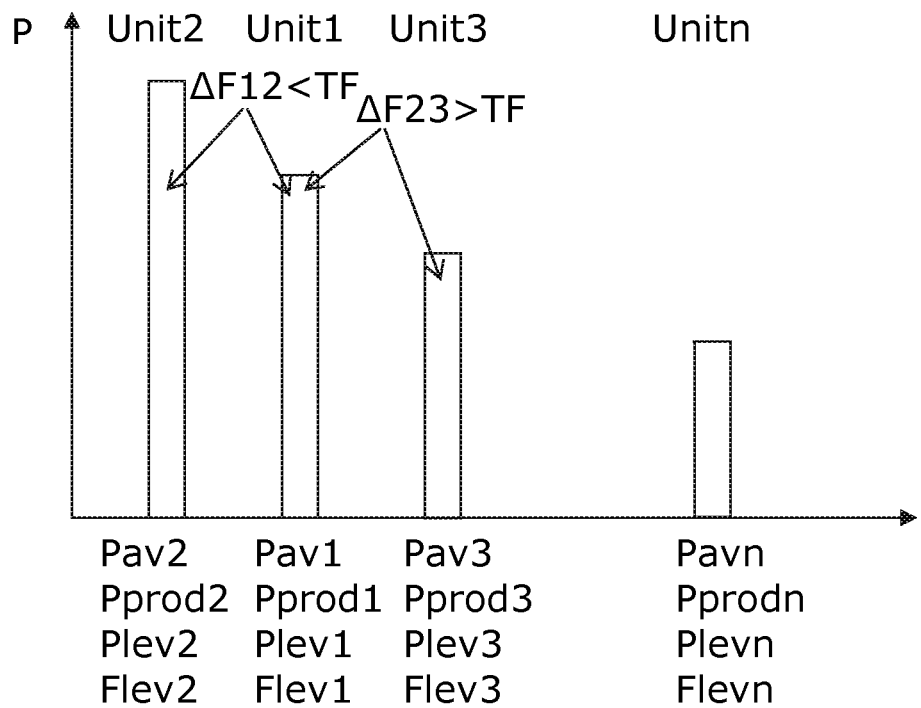

The method for prioritizing and adjusting described in FIG. 4A and FIG. 4B can be formulated as an algorithm, for example as:
Compare the fatigue levels of two neighbour power generating units,
   if the fatigue level difference is below a threshold,
     then compare the power levels of the neighbour power generating units,
       if the difference of the power levels is bigger than a threshold,
         then make the list of power generating units so that the power generating unit with the higher power level is ranked above power generating unit with the lower power level,
       otherwise maintain the same ranking in the list, i.e. no need to swap,
   otherwise maintain the same ranking in the list because the fatigue level difference is significant and the fatigue levels are more important than taking care of power levels.

The algorithm is performed for pairs of power generating units in the list and may be repeated iteratively for the entire list of power generating units.

The fatigue threshold TF may be user defined or may be a fixed fatigue threshold.

Thus, the adjustment comprises reversing the order in the prioritization of two power generating units located next to each other in the prioritization dependent on the difference between the fatigue levels Flev and the power levels Plev of the two power generating units. That is, the order is reversed if the fatigue levels Flev of two neighbor power generating units are similar and the power level Plev for the lower prioritized power generating unit is higher than the power level Plev for the higher prioritized power generating unit. On the other hand, if the fatigue levels Flev of two neighbor power generating units are not similar, e.g. if the fatigue levels Flev are greater than the threshold TF, the order of the neighbor power generating unit are not reversed.

The power set points Pset for at least a fraction of the power generating units 101 are determined as described in connection with FIG. 3A-B. Thus, in response to an increase in the power plant reference Pplant_ref where the power set points Pset are increased, the adjusted prioritized list is adjusted using the available powers Pav of the power generating units. In response to a decrease in the power plant reference Pplant_ref where the power set points Pset are decreased, the adjusted prioritized list is adjusted based on the actual produced powers Pprod of the power generating units.

As described in connection with the examples of FIGS. 3A-B and FIGS. 4A-B, the prioritization may be performed dependent on either the fatigue levels Flev or the power levels Flev, and the adjusting of the prioritized list is performed dependent on the one of the fatigue levels Flev or the power levels Plev which were not used for determining the prioritized list of the power generating units. Whether the prioritization should be based on the fatigue levels or the power levels may be determined on based on user preferences, various operational conditions of the power plant such as agreements with the TSO and the owner of the power plant.

In some cases, for example when the power plant 100 is old or close to its final lifetime or mechanical components of the power generating units require high protection, the prioritization may be based solely on the fatigue levels Flev and without a subsequent adjustment based on power levels Plev.

It may be more important to ensure that further excessive loading of the power generating units are reduced or minimized for older power generating units which already have a considerable accumulated fatigue level. Accordingly, the decision on whether the prioritization should be performed based on fatigue levels or load levels may be performed dependent on an operating time of the power generating units 101 of the power plant 100 since installation of the power plant. Alternatively or additionally, the decision may be performed based on an accumulated fatigue loading of the power plant 100, e.g. obtained as an average over different power generating units over time, e.g. since the installation.

The fatigue level for each of the power generating units may be obtained based on measured data from sensors of each of the power generating units. In case of wind turbine generators 102, examples of such sensors include blade root torque sensors and tower acceleration sensors. The blade root torques can be used to estimate hub moments based on co-ordinate transformations with respect to the pitch angle and hub radius. From the hub moments, the tilt & yaw moments on the main bearing can be estimated based on the azimuth position. From the power and generator speed signal, torque on the gearbox can be calculated, with estimate on the gear train and electrical efficiency. The tower acceleration sensor can be used to find the acceleration levels at tower top, this multiplied with the tower top mass gives the tower top moments. From the tower top moments, the tower bottom moments can be calculated. In general, with such sensors or with external sensors or with a surrogate model, the entire wind turbine loads can be estimated, e.g. the loads of the blades, blade bearing, hub, pitch system, main bearing, gearbox, tower, foundation, etc.

Based on the determined component loads and structural information such as material-types and structural dimensions, the fatigue level of individual components can be determined and thereby the accumulation of fatigue loads over time. The fatigue level Flev for an individual power generating unit can be determined from a combination of the accumulated fatigue levels of one or more of components.

The fatigue level for each of the power generating units may be obtained based on a weighted sum of component fatigue levels of one or more mechanical components of each power generating unit. For example, rotational parts in the blade bearing, gearbox, replaceable parts like bolts are required to be serviced or replaced during annual servicing. Accordingly, particularly up to a planned service, the fatigue level of such components may be weighted higher (unless the accumulated fatigue level is critical) in order to exploit the capacity of such components. For example, the weighting factor of the gearbox may be increased from a factor one up to a factor two since replacement of gearbox components is planed in near future.

The fatigue level may be determined as a fatigue margin based on differences between component fatigue levels of one or more components and predetermined design fatigue limits of the one or more components. Accordingly, the fatigue level may be in the form of a margin which indicates a distance between the actual fatigue level and a design limit of a given component.

The fatigue level Flev for a given power generating unit may be determined by weighting the accumulated fatigue level as a function of the rate-of-change of the fatigue level for that component. Accordingly, a trend of fatigue level accumulation can be used as weighting factor. A rapid increase of the trend of fatigue level for specific component could cause the power generating unit 101 to have lower life time and, in this time, accumulated fatigue level could be given lower weightage such that the power plant controller 110 or dispatcher could react to ensure that such power generating unit 101 is given a low prioritization. In opposite scenario, if the fatigue level accumulation trend is slow, the power generating unit 101 could be given a higher priority.

Figure 5:
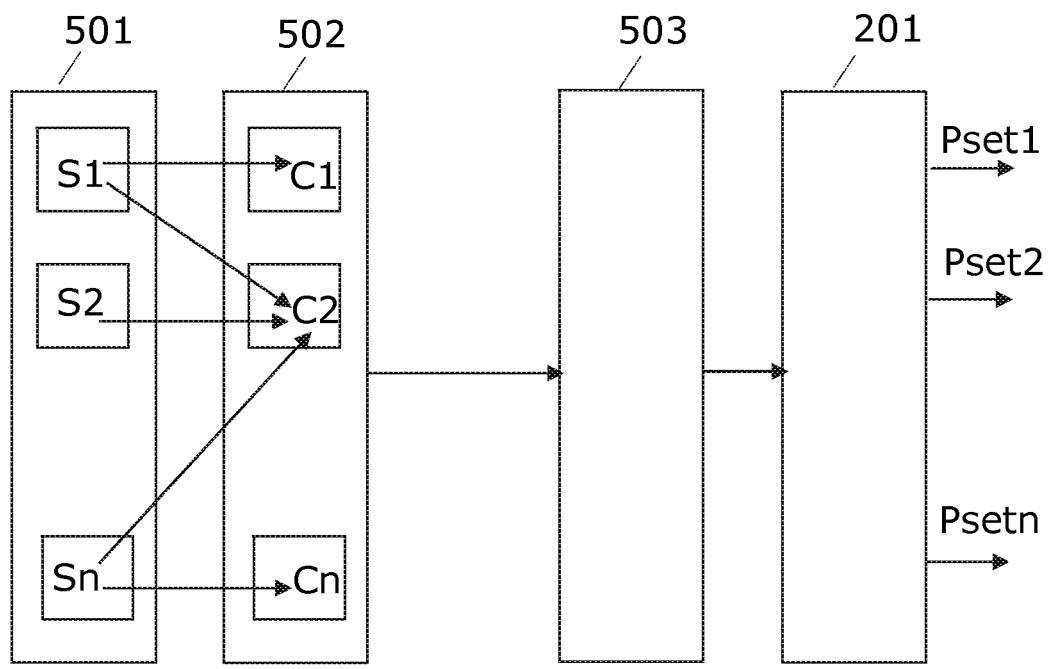
FIG. 5 illustrates an implementation of the control method for controlling power set points of the power generating units.

FIG. 5 illustrates a possible implementation of the control method described in various embodiments. The implementation may include a monitoring system 501 including sensors S1-Sn such as torque and accelerations sensors. The sensors provide load data to a fatigue level calculation module 502 which determines accumulated fatigue levels Flev for different components C1-Cn based on different sensor input. The module 502 may be comprised by individual power generating units 101, by the power plant controller 110 or may be implemented in other ways. Thus, a module 502 may be provided for each power generating unit 101 to determine fatigue loads for that power generating unit 101, or the module 502 may common for all power generating units and arranged to determine fatigue loads for all unit 101 based on data from sensors S1-Sn from all power generating units. The accumulated fatigue levels are made available for the prioritization module 503 which performs the prioritization and prioritization adjustments. The prioritization module 503 may be implemented in the central power plant controller 110. The prioritization such as the prioritized list is made available for the dispatcher 201 which is arranged to determine the power set points Pset1-Psetn for the power generating unit 101 based on the prioritization.

Although the present invention has been described in connection with the specified embodiments, it should not be construed as being in any way limited to the presented examples. The scope of the present invention is to be interpreted in the light of the accompanying claim set. In the context of the claims, the terms "comprising" or "comprises" do not exclude other possible elements or steps. Also, the mentioning of references such as "a" or "an" etc. should not be construed as excluding a plurality. The use of reference signs in the claims with respect to elements indicated in the figures shall also not be construed as limiting the scope of the invention. Furthermore, individual features mentioned in different claims, may possibly be advantageously combined, and the mentioning of these features in different claims does not exclude that a combination of features is not possible and advantageous.

The invention claimed is:

1. A method for controlling power generation from a power plant comprising a plurality of power generating units including at least one wind turbine generator, where the power plant is connected to an electrical power grid for supplying power from the power generating units to the electrical power grid, and where the power generating units are controllable to produce, dependent on individual power set points, power, the method comprises:
   for each power generating unit of the plurality of power generating units:
      (i) obtaining a fatigue level indicative of a combined accumulated fatigue level of one or more mechanical components of the power generating unit; and
      (ii) obtaining a power level indicative of the maximum power that can be produced by the power generating unit or indicative of the power produced by the power generating unit;
   determining a prioritized list of the plurality of power generating units wherein the plurality of power generating units are prioritized based on either the fatigue levels of the plurality of power generating units or the power levels of the plurality of power generating units;
   based on the plurality of power generating units being prioritized based on the fatigue levels of the plurality of power generating units, determining a first difference between the power level of a first power generating unit in the prioritized list and the power level of a second power generating unit located at a lower priority in the prioritized list than the first power generating unit;
   based on the plurality of power generating units being prioritized based on the power levels of the plurality of power generating units, determining a second difference between the fatigue level of the first power generating unit and the fatigue level of the second power generating unit;
   changing an order of the first power generating unit and the second power generating unit in the prioritized list based on the first difference or the second difference to produce an adjusted prioritized list; and
   determining power set points for a portion of the plurality of power generating units based on the prioritization of the plurality of power generating units in the adjusted prioritized list.

2. The method of claim 1, where obtaining the power level comprises obtaining an available power level indicative of the maximum power that can be produced by the power generating unit, or obtaining an actual power level indicative of the power currently produced by the power generating unit.

3. The method of claim 2, where the power set points have been determined based on using the available power level for the determination of the prioritized list or for the changing of the order.

4. The method of claim 1, wherein the order of the first and second power generating units is changed based on the fatigue level of the second power generating unit indicating a lower fatigue than the fatigue level for of first power generating unit, or the power level of the second power generating unit being higher than the power level of the first power generating unit.

5. The method of claim 1, comprising determining the prioritized list or changing the order in response to a change of a power reference.

6. The method of claim 1, comprising determining if the prioritization will be performed dependent on the fatigue levels or the power levels based on an operating time of the power generating units.

7. The method of claim 1, wherein the fatigue level for each of the power generating units is obtained based on a weighted sum of component fatigue levels of one or more mechanical components of each power generating unit.

8. The method of claim 1, wherein the fatigue level is determined as a fatigue margin based on differences between component fatigue levels of one or more components and predetermined design fatigue limits of the one or more components.

9. The method of claim 1, wherein the fatigue level for each power generating unit is weighted dependent on a rate of change of fatigue levels determined for one or more components.

10. A central controller for controlling power production of a power plant which comprises a plurality of power generating units including at least one wind turbine generator, where the power plant is connected to an electrical power grid for supplying power from the power generating units to the electrical power grid, and where at the central controller is arranged to dispatch individual power set points to the power generating units, and where the central controller is arranged to perform an operation, comprising:
  for each power generating unit of the plurality of power generating units:
    (i) obtaining a fatigue level indicative of a combined accumulated fatigue level of one or more mechanical components of the power generating unit; and
    (ii) obtaining a power level indicative of the maximum power that can be produced by the power generating unit or indicative of the power produced by the power generating unit;
  determining a prioritized list of the plurality of power generating units wherein the plurality of power generating units are prioritized based on either the fatigue levels of the plurality of power generating units or the power levels of the plurality of power generating units;
  based on the plurality of power generating units being prioritized based on the fatigue levels of the plurality of power generating units, determining a first difference between the power level of a first power generating unit in the prioritized list and the power level of a second power generating unit located at a lower priority in the prioritized list than the first power generating unit;
  based on the plurality of power generating units being prioritized based on the power levels of the plurality of power generating units, determining a second difference between the fatigue level of the first power generating unit and the fatigue level of the second power generating unit;
  changing an order of the first power generating unit and the second power generating unit in the prioritized list based on the first difference or the second difference to produce an adjusted prioritized list; and
  determining power set points for a portion of the plurality of power generating units based on the prioritization of the plurality of power generating units in the adjusted prioritized list.

11. The method of claim 2, wherein the power set points have been determined based on using the actual power level for the determination of the prioritized list or for the changing of the order.

12. A computer program product comprising software code adapted to control a plurality of power generating units of a power plant when executed on a data processing system, the computer program product being adapted to perform an operation, comprising:
  for each power generating unit of the plurality of power generating units including at least one wind turbine generator:
    (i) obtaining a fatigue level indicative of a combined accumulated fatigue level of one or more mechanical components of the power generating unit; and
    (ii) obtaining a power level indicative of the maximum power that can be produced by the power generating unit or indicative of the power produced by the power generating unit;
  determining a prioritized list of the plurality of power generating units wherein the plurality of power generating units are prioritized based on either the fatigue levels of the plurality of power generating units or the power levels of the plurality of power generating units;
  based on the plurality of power generating units being prioritized based on the fatigue levels of the plurality of power generating units, determining a first difference between the power level of a first power generating unit in the prioritized list and the power level of a second power generating unit located at a lower priority in the prioritized list than the first power generating unit;
  based on the plurality of power generating units being prioritized based on the power levels of the plurality of power generating units, determining a second difference between the fatigue level of the first power generating unit and the fatigue level of the second power generating unit;
  changing an order of the first power generating unit and the second power generating unit in the prioritized list based on the first difference or the second difference to produce an adjusted prioritized list; and
  determining power set points for a portion of the plurality of power generating units based on the prioritization of the plurality of power generating units in the adjusted prioritized list; and
  dispatching the determined power set points to the respective power generating units of the portion of the plurality of power generating units.

13. The computer program of claim 12, where obtaining the power level of a power generating unit of the plurality of power generating units comprises obtaining an available power level indicative of the maximum power that can be produced by the power generating unit of the plurality of power generating units, or obtaining an actual power level indicative of the power currently produced by the power generating unit of the plurality of power generating units.

14. The computer program of claim 13, wherein the power set points have been determined based on using the available power level for the determination of the prioritized list or for the changing of the order.

15. A power plant, comprising:
  a plurality of power generating units including at least one wind turbine generator; and
  a central controller, comprising:
    an I/O interface connected to the plurality of power generating units; and
    one or more processors configured to perform an operation, comprising:
      for each power generating unit of the plurality of power generating units:
        (i) obtaining a fatigue level indicative of a combined accumulated fatigue level of one or more mechanical components of the power generating unit; and
        (ii) obtaining a power level indicative of the maximum power that can be produced by the power generating unit or indicative of the power produced by the power generating unit;

determining a prioritized list of the plurality of power generating units wherein the plurality of power generating units are prioritized based on either the fatigue levels of the plurality of power generating units or the power levels of the plurality of power generating units;

based on the plurality of power generating units being prioritized based on the fatigue levels of the plurality of power generating units, determining a first difference between the power level of a first power generating unit in the prioritized list and the power level of a second power generating unit located at a lower priority in the prioritized list than the first power generating unit;

based on the plurality of power generating units being prioritized based on the power levels of the plurality of power generating units, determining a second difference between the fatigue level of the first power generating unit and the fatigue level of the second power generating unit;

changing an order of the first power generating unit and the second power generating unit in the prioritized list based on the first difference or the second difference to produce an adjusted prioritized list; and determining power set points for a portion of the plurality of power generating units based on the prioritization of the plurality of power generating units in the adjusted prioritized list.

16. The power plant of claim 15, where obtaining the power level of a power generating unit of the plurality of power generating units comprises obtaining an available power level indicative of the maximum power that can be produced by the power generating unit of the plurality of power generating units, or obtaining an actual power level indicative of the power currently produced by the power generating unit of the plurality of power generating units.

17. The power plant of claim 16, wherein the power set points have been determined based on using the available power level for the determination of the prioritized list or for the changing of the order.

* * * * *